(12) United States Patent
Kuchi et al.

(10) Patent No.: US 9,537,557 B2
(45) Date of Patent: Jan. 3, 2017

(54) METHOD AND APPARATUS FOR A CLUSTER SPECIFIC CSI FEEDBACK

(71) Applicant: Indian Institute of Technology Hyderabad, Yeddumailaram (IN)

(72) Inventors: Kiran Kumar Kuchi, Hyderabad (IN); Shahriar Emami, San Jose, CA (US)

(73) Assignee: INDIAN INSTITUTE OF TECHNOLOGY HYDERABAD (IN)

( * ) Notice: Subject to any disclaimer, the term of this patent is extended or adjusted under 35 U.S.C. 154(b) by 87 days.

(21) Appl. No.: 14/616,268

(22) Filed: Feb. 6, 2015

(65) Prior Publication Data
US 2015/0229377 A1      Aug. 13, 2015

(30) Foreign Application Priority Data
Feb. 7, 2014 (IN) .............................. 570/CHE/2014

(51) Int. Cl.
*H04B 7/06*     (2006.01)
*H04W 24/08*    (2009.01)
*H04J 11/00*    (2006.01)

(52) U.S. Cl.
CPC ......... *H04B 7/0626* (2013.01); *H04J 11/0023* (2013.01)

(58) Field of Classification Search
CPC ...... H04W 24/06; H04W 24/08; H04W 24/10; H04W 28/0231; H04W 28/0236; H04W 52/244; H04W 72/082; H04W 72/085; H04W 72/1231; H04B 7/06; H04B 7/0619; H04B 7/0626; H04B 7/0632; H04B 17/00; H04B 17/309; H04B 17/318; H04B 17/345; H04J 11/0023
See application file for complete search history.

(56) References Cited

U.S. PATENT DOCUMENTS

| | | | | |
|---|---|---|---|---|
| 8,930,949 B2* | 1/2015 | Chen | ................... | G06F 11/3006 709/201 |
| 9,001,677 B2* | 4/2015 | Kim | .................... | H04W 74/002 370/252 |
| 9,154,209 B2* | 10/2015 | Chun | ................... | H04B 7/0626 |
| 9,380,466 B2* | 6/2016 | Eyuboglu | ............. | H04W 24/02 |
| 2012/0327800 A1* | 12/2012 | Kim | .................... | H04W 72/082 370/252 |
| 2013/0021926 A1* | 1/2013 | Geirhofer | ............. | H04L 5/0048 370/252 |
| 2013/0044685 A1* | 2/2013 | Fong | .................... | H04J 11/0053 370/328 |
| 2013/0286866 A1* | 10/2013 | Hammarwall | ......... | H04B 7/024 370/252 |
| 2014/0038623 A1* | 2/2014 | Davydov | ............... | H04W 24/04 455/450 |

(Continued)

*Primary Examiner* — Tri H Phan

(57) ABSTRACT

Embodiment herein provide a method and system of reporting cluster specific CSI feedback by user equipment (UE) to a cloud system. The UE associates with the cloud using a biased association or an unbiased association. In a biased association, a ratio between the highest received power from a Macro BS and a Pico base station is determined by the UE and compared with a threshold (bias). If the ratio is greater than the bias, the UE associates with the Pico BS. The UE reports CSI for a set of dominant Macro BSs and Pico BSs within a cluster. The UE can report the IDs of the BSs which contribute to dominant interference caused by the BSs of neighboring clusters.

22 Claims, 7 Drawing Sheets

(56) References Cited

U.S. PATENT DOCUMENTS

| | | | |
|---|---|---|---|
| 2014/0044061 A1* | 2/2014 | Yue | H04W 72/042 370/329 |
| 2014/0241323 A1* | 8/2014 | Park | H04L 5/0035 370/332 |
| 2014/0269383 A1* | 9/2014 | He | H04W 28/24 370/252 |
| 2016/0088617 A1* | 3/2016 | Goldhamer | H04L 1/18 370/330 |
| 2016/0233994 A1* | 8/2016 | Prasad | H04L 5/0035 |

* cited by examiner

METHOD AND APPARATUS FOR A CLUSTER SPECIFIC CSI FEEDBACK

FIELD OF EMBODIMENT

The present embodiment relates to wireless communications networks and more particularly to a method and apparatus for reporting cluster specific CSI feedback for a cloud radio.

BACKGROUND OF EMBODIMENT

In next generation cloud communication technology, wireless network architecture includes a large group of Antenna Ports (ATPs) which are connected to a central processor (or a Remote Base Station (RBS)) and carries out baseband processing for the entire network.

Availability of baseband signals corresponding to all the User Equipment (UEs) in the network provides multiple benefits including simplified user scheduling, automatic load balancing and the like. As the density of the ATPs grow, transmit power of the Base Station (BS) can be reduced to low values without compromising the network performance. In conventional networks, such high density deployment may lead to frequent handovers.

In conventional systems, the base station (BS) may employ spatial multiplexing (SM) techniques using multiple antennas in downlink. Similarly, the cloud radio may be designed to handle multi-stream transmission from each TP. FIG. 1 is a high level architecture of a Cloud Radio Access Network (CRAN). In a cloud radio, the network may assign the base station identification (BS ID) number to a group of antenna ports while individual antenna ports may be given a unique antenna port number. FIG. 2 illustrates a conventional Heterogeneous networks (HetNets) Cloud Radio with a plurality of macro cells and pico cells illustrating a HetNet Cloud Radio. Third Generation Partnership (3GPP) standard introduced HetNets in Release-10 of the 4G Long-Term-Evolution (LTE) standard. This feature allows deployment of small cells (Pico cells and Femto cells). All cells can fully utilize an entire available bandwidth in universal frequency reuse-one mode. The introduction of Pico cells within the coverage area of a Macro cell may lead to mutual interference between the Macro and Pico cells.

Existing CSI feedback methods do not distinguish between BS of its own cluster and the neighboring cluster. To mitigate intra-cluster interference ones needs CSI of BSs/ATPs that belong to the same cluster. However, since the RBS uses centralized precoding to eliminate intra-cluster interference, there is no need to obtain CSI of BSs/ATPs that belong to neighboring clusters. The inter-cluster scheduling can be used to mitigate inter-cluster interference if the UE feedback the IDs of BS that are present in the neighboring clusters but can cause dominant interference to the UE.

OBJECT OF EMBODIMENT

The principal object of the embodiment herein is to provide a method of reporting CSI feedback by user equipment (UE) in a clustered communication network.

Another object of the embodiment herein is to provide UE association methods and CSI feedback methods suitable for cloud radios employing single or multiple classes of Antenna ports (ATPs)/Base Station (BSs).

Another object of the embodiment herein is to provide high network capacity with significantly better quality of service (QoS).

SUMMARY

Accordingly the embodiment herein provide a method of reporting channel state information (CSI) feedback by a UE in a clustered communication network. The method comprising measuring signal strength of a plurality of base stations (BSs). Further, the method includes selecting a set of BSs in the plurality of BSs based on highest signal strength. Furthermore, the method includes reporting CSI feedback of the set of BSs and antenna ports associated with the BSs to a cloud system.

Accordingly the embodiment herein provide a cloud system comprising a plurality of clusters, in which each cluster comprises a plurality of base stations (BSs), and user equipment (UE). The UE is configured to measure signal strength of the plurality of BSs. Further, the UE is configured to select a set of BSs in the plurality of BSs based on signal strength. Furthermore, the UE is configured to report CSI feedback of the set of BSs and antenna ports associated with the BSs to the cloud system.

Accordingly the embodiment herein provide user equipment (UE) for reporting channel state information (CSI) feedback in a clustered communication network. The UE is configured to measure signal strength of the plurality of BSs. Further, the UE is configured to select a set of BSs in the plurality of BSs based on signal strength. Furthermore, the UE is configured to report CSI feedback of the set of BSs and antenna ports associated with the BSs to the cloud system.

These and other aspects of the embodiment herein will be better appreciated and understood when considered in conjunction with the following description and the accompanying drawings. It should be understood, however, that the following descriptions, while indicating preferred embodiment and numerous specific details thereof, are given by way of illustration and not of limitation. Many changes and modifications may be made within the scope of the embodiment herein without departing from the spirit thereof, and the embodiment herein include all such modifications.

BRIEF DESCRIPTION OF FIGURES

This embodiment is illustrated in the accompanying drawings, throughout which like reference letters indicate corresponding parts in the various figures. The embodiment herein will be better understood from the following description with reference to the drawings, in which.

DETAILED DESCRIPTION OF EMBODIMENT

Figure 1:
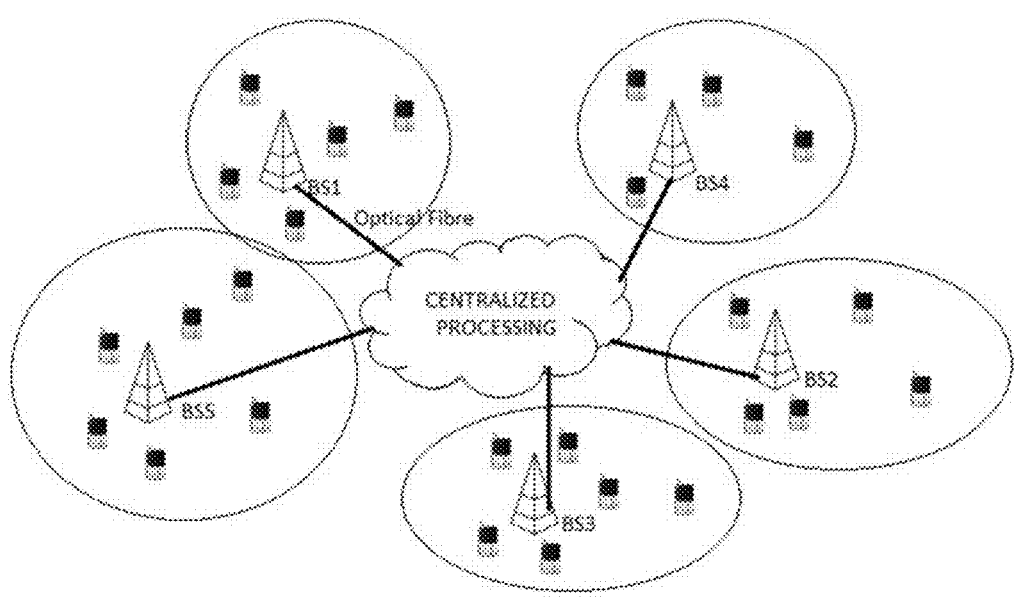
FIG. 1 is a high level architecture of a Cloud Radio Access Network (CRAN)
Figure 2:
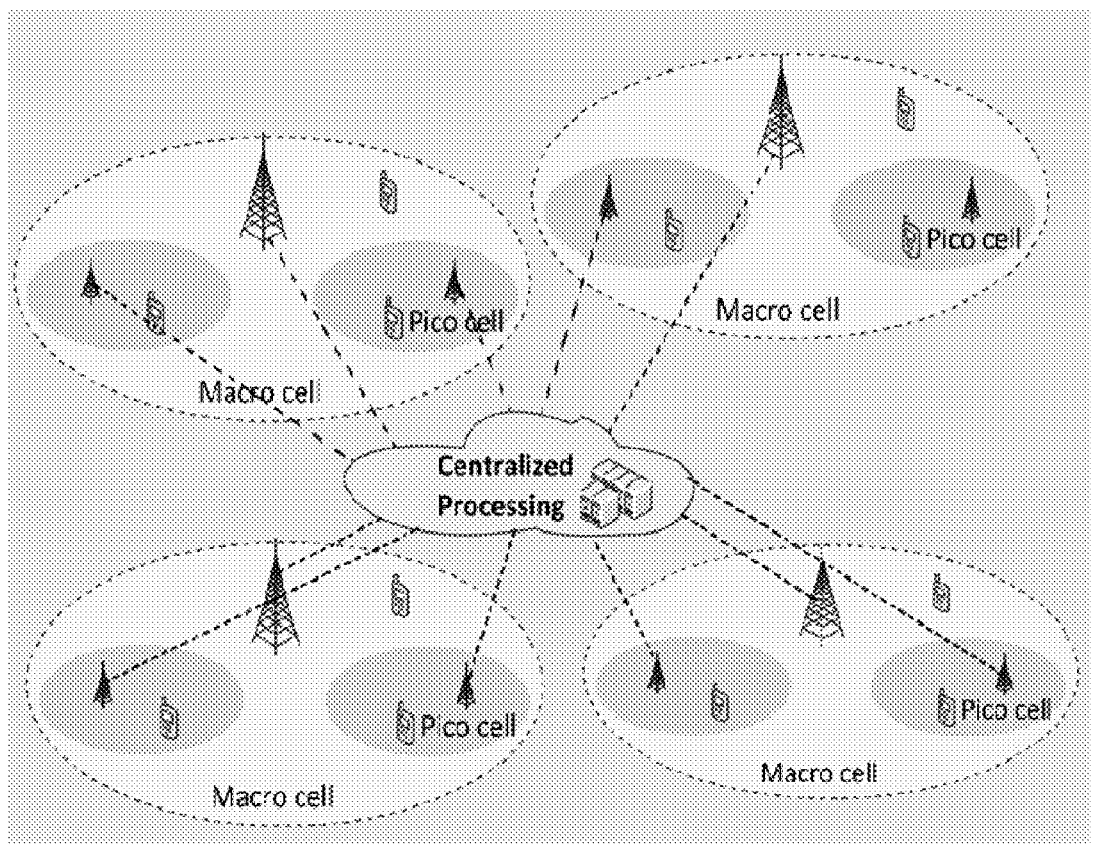
FIG. 2 illustrates a HetNet Cloud Radio with a plurality of macro cells and pico cells illustrating a HetNet Cloud Radio.

The embodiment herein and the various features and advantageous details thereof are explained more fully with reference to the non-limiting embodiment that are illustrated in the accompanying drawings and detailed in the following description. Descriptions of well-known components and processing techniques are omitted so as to not unnecessarily obscure the embodiment herein. Also, the various embodiment described herein are not necessarily mutually exclusive, as some embodiment can be combined with one or more other embodiment to form new embodiment. The term "or" as used herein, refers to a non-exclusive or, unless otherwise indicated. The examples used herein are intended merely to facilitate an understanding of ways in which the embodiment herein can be practiced and to further enable those skilled in the art to practice the embodiment herein. Accordingly, the examples should not be construed as limiting the scope of the embodiment herein.

Throughout the description the terms cloud system and central processing are used interchangeably.

The embodiments herein achieve a method and system of reporting channel state information (CSI) feedback by a UE in a clustered communication network. The method includes measuring signal strength of a plurality of base stations (BSs) and selecting a set of macro BSs and a set of pico BSs in the plurality of BSs with highest signal strength. Further, the method includes reporting the CSI feedback associated with the set of macro base stations and the set of pico base stations to a cloud system.

In an embodiment, the CSI feedback includes identifiers (IDs) of the set of macro BSs and the set of pico BSs and antenna ports (ATPs) of the set of macro BSs and the set of pico BSs.

In an embodiment, the UE determines whether a current serving BS is present in the set of macro BSs and the set of pico BSs. In an embodiment, the serving BS is either a macro BS, or a pico BS. Further, the UE includes an identifier (ID) of the serving BS to the set of macro BSs and the set of pico BSs in response to determining that the serving BS is absent in the set of macro BSs and the set of pico BSs.

In an embodiment, the plurality of BSs is present in a cluster associated with the UE.

In an embodiment, the plurality of BSs is present in a neighboring cluster to the cluster in which the UE is present.

In an embodiment, the UE reports an ID of a plurality of BSs in the neighboring cluster if the interference of the plurality of BSs in the neighboring cluster exceeds a predetermined threshold.

In an embodiment, the CSI feedback is reported for available bands.

In an embodiment, the CSI feedback is reported for a set of bands.

In an embodiment, the CSI feedback is reported for a predefined band. In an embodiment, the predefined band is decided by the UE or the cloud system.

In an embodiment, the UE reports a time domain of CSI feedback associated with the set of macro BSs and the set of pico BSs to the cloud system.

In an embodiment, the UE determines a plurality of bands based on the CSI of the serving BS and reports the CSI feedback to the cloud system for the plurality of bands.

User Association in HetNets

When a UE enters the network, the UE identifies a pair of Macro and Pico base stations with highest average received power levels. The UE associates with the Pico BS, if the ratio of power levels between the Pico and the Macro is greater than a predetermined threshold (called bias); otherwise the user associates with the Macro BS. The biased association controls the percentage of users associated with the Pico BSs. Since the Macro BS has significantly higher transmitter power compared to the Pico BS, the Macro BS can have higher coverage footprint. Choosing the bias value of less than one ensures that more users can be associated with the Pico BS thus increasing its utility and also decreasing Macro BS load. Though biased cell association controls the interference to some extent, the total interference contributed by the macro cell and pico cell tiers can lead to a significantly lower performance for some users.

HetNet Cloud

Consider the cloud radio which supports BSs with different power classes. For example all the ATPs corresponding to the Macro BSs transmit with a maximum power level of Pm while all the ATPs corresponding to the Pico BSs may transmit at a lower power level Pp. The cloud radio may support the ATPs with multiple power classes (more than two).

Referring now to the drawings, and more particularly to FIGS. 3 through 7, where similar reference characters denote corresponding features consistently throughout the figures, there are shown preferred embodiment.

Figure 3:
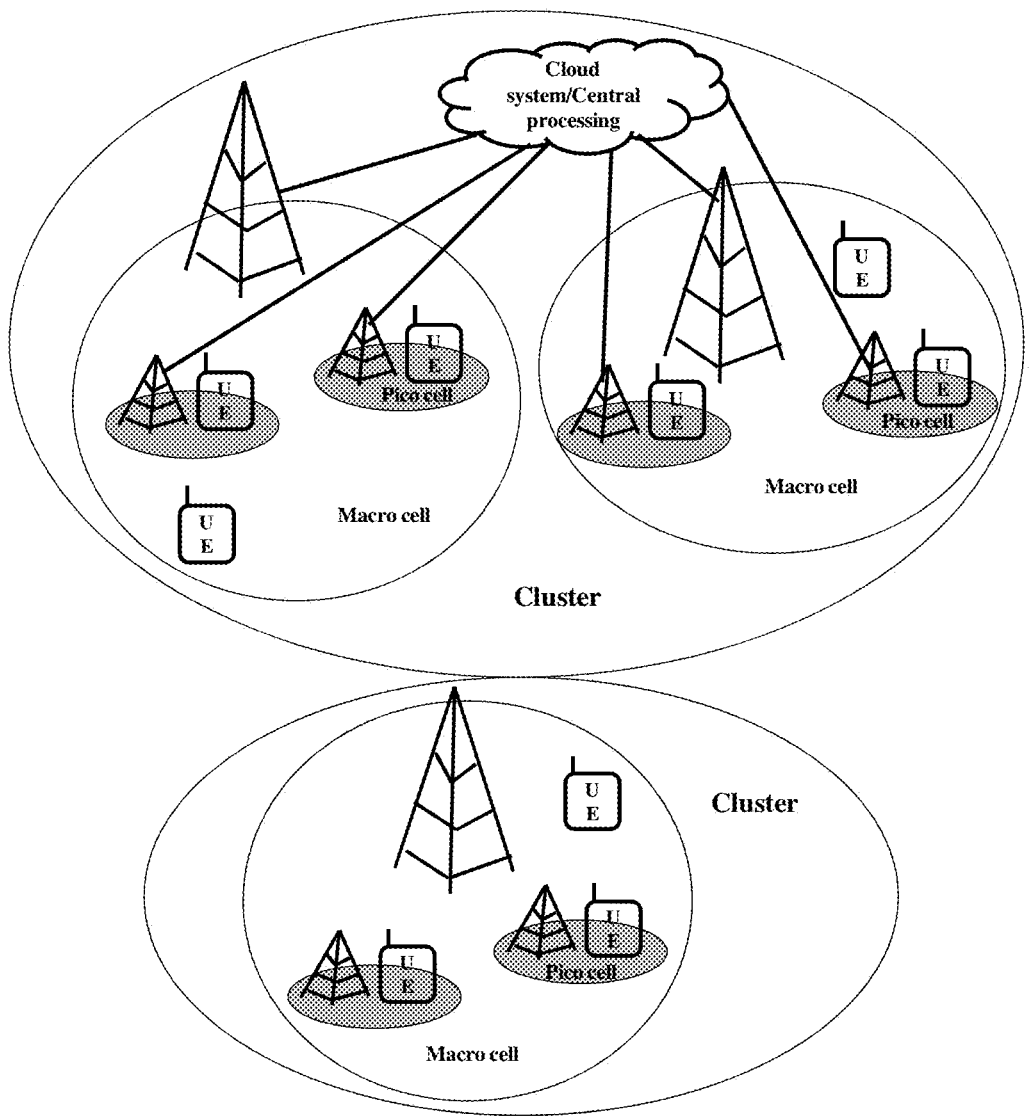
FIG. 3 illustrates a HetNet Cloud Radio with a plurality of clusters, according to embodiment disclosed herein.

FIG. 3 illustrates a HetNet cloud system with a plurality of clusters, according to embodiment disclosed herein. In an embodiment, the BSs in the cloud system are connected to each other through optical fibers. In another embodiment, the BSs in the cloud system are connected to each other through wireless connection.

In theory, the size of the cloud in a cloud radio network may be limitless. However in real deployments, the size of the cloud can either limited by propagation delay in the optical fiber communication or other deployment related limitations. In such cases, an operator can group sets of BSs or ATPs as a cluster and restrict cloud processing to the BSs/ATPs within the cluster. In this case, the effects of inter-cluster interference may be encountered and achievable rate as obtained by an encoder with complete CSI gets affected because the inter-cluster interference may not be suppressed. The knowledge of the CSI for links between BSs/ATPs and UEs within the cluster can be used as input for the encoder, whereas the interference may be due to the BSs/ATPs in other clusters.

Handling Intra-Cluster Interference in the Downlink

In conventional multi-cell joint processing methods, the interference generated by the BSs/ATPs of the cluster (called intra-cluster interference) can be mitigated using centralized precoding. Techniques such as Tomilson Harashima Precoding (THP), Zero-Forcing (ZF) or regularized ZF methods can be employed to mitigate intra-cluster interference. This approach requires CSI feedback from each user. In many cases, the amount of required feedback becomes prohibitively large.

Handling Inter-Cluster Interference in the Downlink

The BSs that belong to different clusters are not connected to the central processor (or the RBS); centralized precoding cannot mitigate interference contributed by the BSs/ATPs of a neighboring cluster. However, if the users located at cluster edges feedback the BS/ATP IDs of the neighboring BS/ATPs that contribute to dominant interference, the inter-cluster coordination techniques can be used to mitigate interference.

One simple technique involves scheduling of the cluster edge users such that dominant interference can be avoided. For this feature to work—the neighboring clusters must exchange scheduling information and the users feedback the IDs of the BS/ATPs that belong to the neighboring cluster if the individual interference of level these BSs exceeds a certain threshold.

Figure 4:
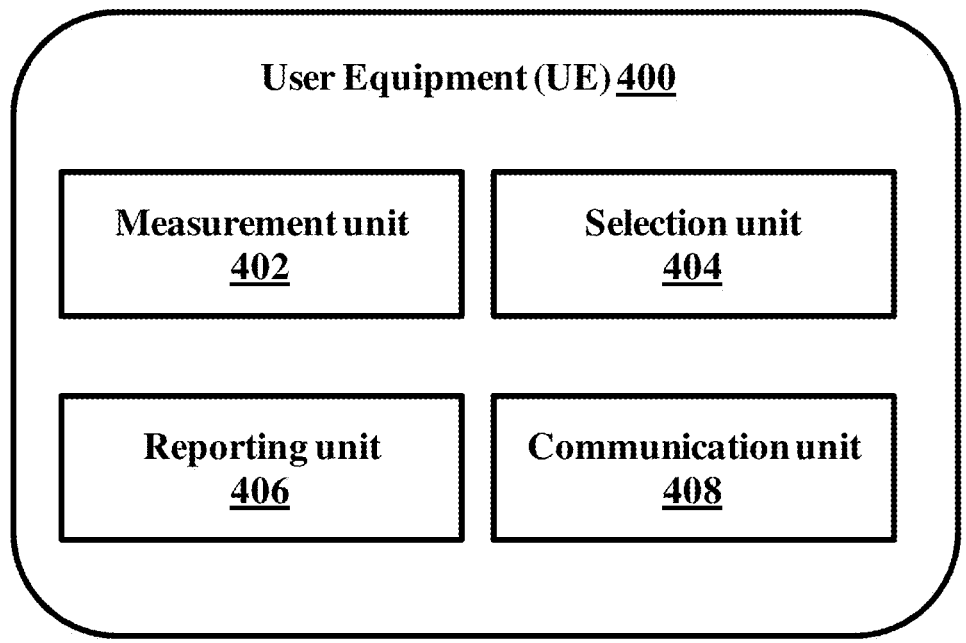
FIG. 4 shows various modules present in the UE, according to embodiment as disclosed herein.

FIG. 4 shows various modules present in the UE, according to embodiment as disclosed herein. As shown in the FIG. 4, the UE 400 includes a measurement unit 402, a selection unit 404, a reporting unit 406 and a communication unit 408. The functionalities of the units are explained in conjunction to FIGS. 5 to 7.

Figure 5:
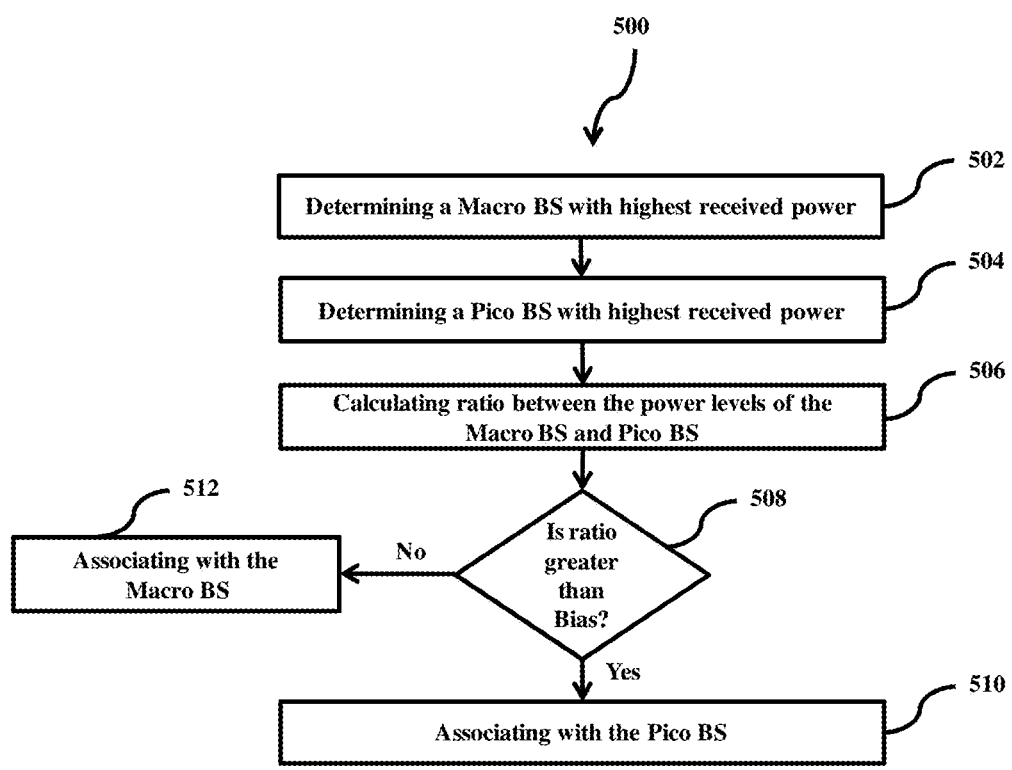
FIG. 5 is a flow diagram illustrating a method of UE association and CSI feedback in cloud HetNet based on biased association, according to embodiment disclosed herein.

Two Association Rules:

User Association and CSI Feedback in Cloud HetNets Based on Biased Association:

FIG. 5 is a flow diagram illustrating a method 500 of UE association and CSI feedback in cloud HetNet based on biased association, according to embodiment disclosed herein. At step 502, the method 500 includes determining a Macro BS with highest received power. In an embodiment, the method 500 allows a measurement unit 402 to determine the Macro BS with highest received power (designated as best Macro BS). At step 504, the method 500 includes determining a Pico BS with highest received power. In an embodiment, the method 500 allows the measurement unit 402 to determine the Pico BS with highest received power (designated as best Pico BS). At step 506, the method 500 includes calculating ratio between the power levels of the Macro BS and the Pico BS. In an embodiment, the method 500 allows the measurement unit 402 to calculate ratio between the power levels of the Macro BS and the Pico BS. At step 508, the method 500 includes determining whether the calculated ratio is greater than Bias. In an embodiment, the method 500 allows the measurement unit 402 to determine whether the calculated ratio is greater than Bias. If it is determined at step 508, that the calculated ratio is greater than Bias, then at step 510, the method 500 includes associating with the Pico BS. In an embodiment, the method 500 allows the selection unit 404 to associate the UE with the best Pico BS. If it is determined at step 508, that the calculated ratio is not greater than Bias, then at step 512, the method 500 includes associating with the Macro BS. In an embodiment, the method 500 allows the selection unit to associate the UE with the best Macro BS.

In an embodiment, the power measurements can be accomplished using synchronization channel.

The various actions, acts, blocks, steps, and the like in the method 500 may be performed in the order presented, in a different order or simultaneously. Further, in some embodiment, some actions, acts, blocks, steps, and the like may be omitted, added, modified, skipped, and the like without departing from the scope of the embodiment.

Figure 6:
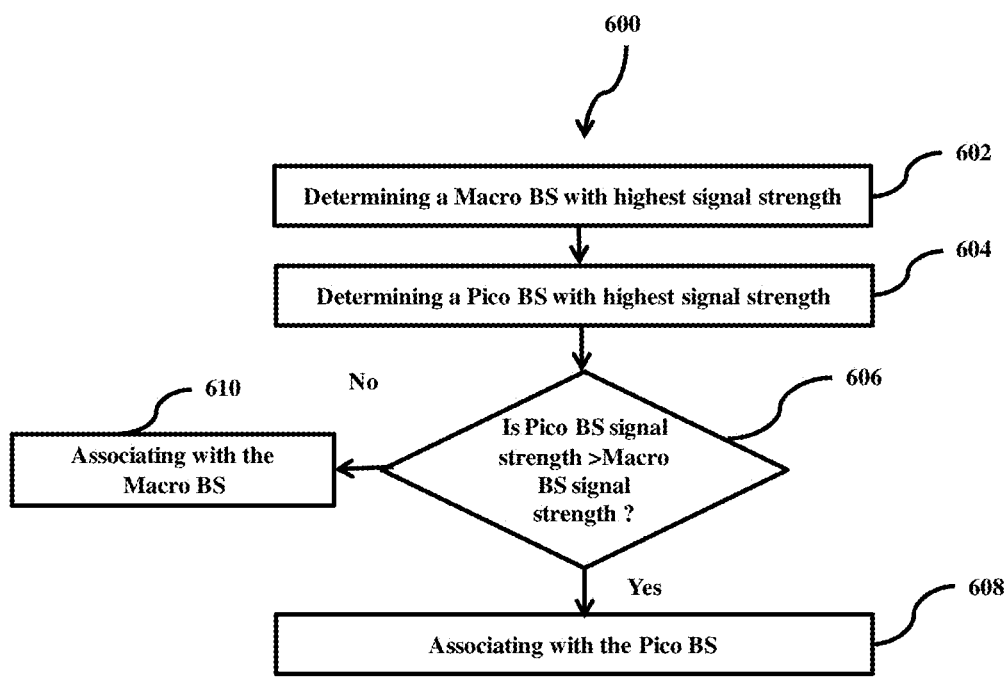
FIG. 6 is a flow diagram illustrating a method of UE association and CSI feedback in cloud HetNet based on unbiased association, according to embodiment disclosed herein.

User Association and CSI Feedback in Cloud HetNets Based on Unbiased Association:

FIG. 6 is a flow diagram illustrating a method 600 of UE association and CSI feedback in cloud HetNet based on unbiased association, according to embodiment disclosed herein. At step 602, the method 600 includes determining a Macro BS with highest signal strength. In an embodiment, the method 600 allows the measurement unit 402 to determine the Macro BS with highest signal strength. At step 604, the method 600 includes determining a Pico BS with highest signal strength. In an embodiment, the method 600 allows the measurement unit 402 to determine the Pico BS with highest signal strength. At step 606, the method 600 includes determining whether Pico BS signal strength is greater than the Macro BS signal strength. In an embodiment, the method 600 allows the measurement unit 402 to determine whether the Pico BS signal strength is greater than the Macro BS signal strength. If is determined at step 606, that the Pico BS signal strength is greater than the Macro BS, then at step 608, the method 600 includes associating with the Pico BS. In an embodiment, the method 600 allows the selection unit 404 to associate the UE with the Pico BS. If it is determined at step 606, that the Pico BS signal strength is not greater than the Macro BS, then at step 610, the method 600 includes associating with the Macro BS. In an embodiment, the method 600 allows the selection unit 404 to associate the UE with the Macro BS.

The various actions, acts, blocks, steps, and the like in the method 600 may be performed in the order presented, in a different order or simultaneously. Further, in some embodiment, some actions, acts, blocks, steps, and the like may be omitted, added, modified, skipped, and the like without departing from the scope of the embodiment.

Figure 7:
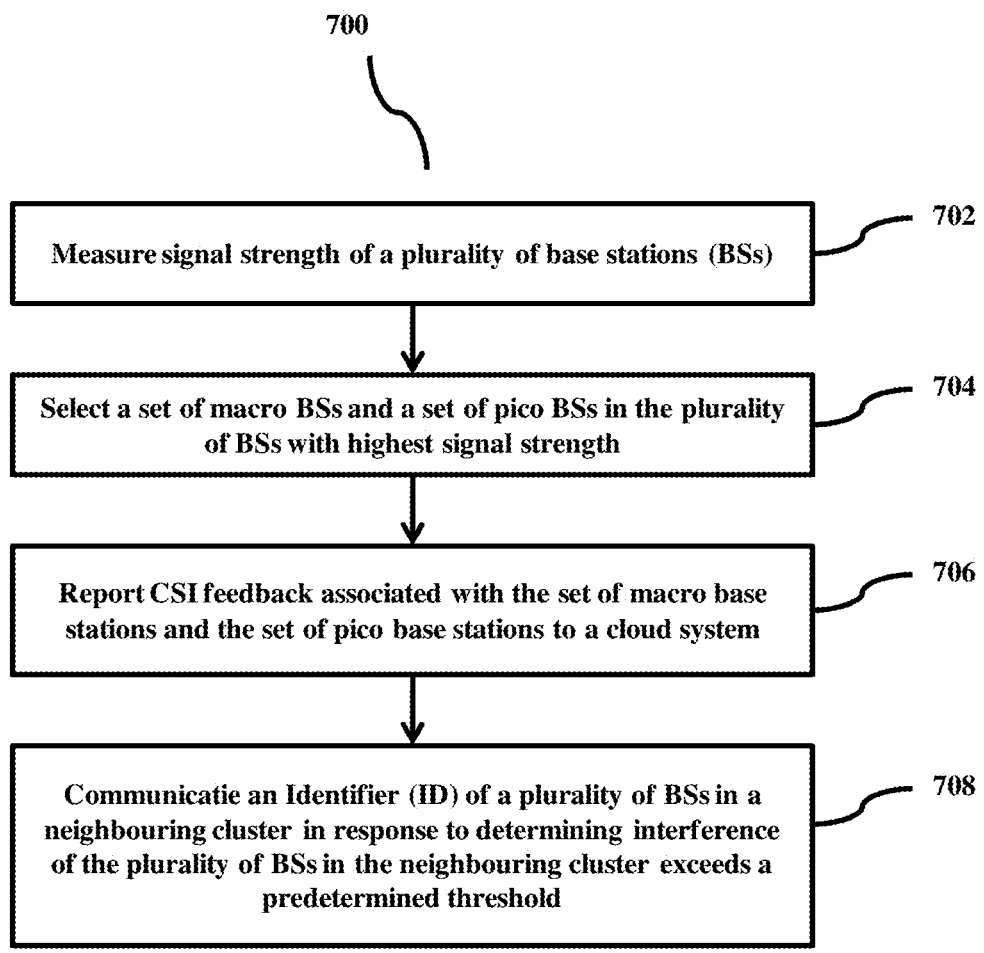
FIG. 7 is a flow diagram illustrating a method of reporting CSI feedback by the UE in a clustered communication network, according to embodiment as disclosed herein.

FIG. 7 is a flow diagram illustrating a method 700 of reporting CSI feedback by the UE in a clustered communication network, according to embodiment as disclosed herein.

At step 702, the method 700 includes measuring signal strength of a plurality of BSs. In an embodiment, the method 700 allows the measurement unit 402 to measure the signal strength of the plurality of BSs.

At step 704, the method 700 includes with the highest signal strength. In an embodiment, the method 700 allows the selection unit 404 to selecting a set of BSs in the plurality of BSs based on highest signal strength.

In an embodiment, the set of BSs includes a set of macro BSs, a set of pico BSs or a combination of macro BSs and pico BSs.

In an embodiment, after associating with the network, the cloud system announces the set of macro BSs and pico BSs that belong to their own cluster as well as the neighboring clusters.

In an embodiment, the cloud system announces the set of Macro BSs and Pico BSs that belong to their own cluster as well as the neighboring clusters using a control channel.

At step 706, the method 700 includes reporting CSI feedback associated with the set of macro base stations and the set of pico base stations to the cloud system. In an embodiment, the method 700 allows the reporting unit 406 to report the CSI feedback to the cloud system.

In an embodiment, the cloud system requests the UE to report the CSI feedback for a total of L Macro/Pico BSs within its cluster.

At step 708, the method 700 includes communicating the IDs of BS and ATPs associated with the BS that contributes to dominant interference from the neighboring cluster when the dominant interference level exceeds a predefined threshold. In an embodiment, the method 700 allows the communication unit 408 to communicate the IDs of BS and ATPs associated with the BS that contribute to dominant interference from the neighboring cluster.

In an embodiment, the predetermined threshold is communicated to the UE by the cloud system.

The cloud system allocates pilot patterns for the Macro and Pico BSs within each cluster. The cloud system CSI feedback for a set of UEs.

In an embodiment, the UE determines a set of Lt1 BSs with highest signal strength. If the associated BS (serving BS) is not in this set, the BS ID of the associated BS is added to this set. The size of this new set is Lt. Among the Lt BSs, L BSs belong to its own cluster and Lt-L BSs belong to the neighboring clusters. In some cases Lt-L may take a zero value. The L BSs are composed of Lm Macro BSs and Lp Pico BSs that belong its own cluster where L=Lm+Lp. The L BSs are referred to as L best BSs.

In an embodiment, this measurement can be accomplished using the synchronization channel or using the pilots patterns designated for CSI measurements.

In an embodiment, the UE measures the CSI feedback of all active antenna ports corresponding to the L BSs for the entire available band or for a set of bands.

In an embodiment, the set of bands is communicated by the cloud system to the UE.

In an embodiment, the UE measures the residual noise ratio and the interference of the unselected BSs.

Feedback Mode-1:

In this mode, the UE reports the CSI feedback for the antenna ports of Lp best Pico BSs and Lm best Macro BSs for the set of bands. The said set of bands may span the entire available bandwidth or restricted to a set of bands.

In an embodiment, the UE reports the CSI feedback along with the respective BS IDs and ATP IDs to the cloud system.

In an embodiment, the CSI feedback may be quantized to reduce feedback overhead.

In an embodiment, the UE may feedback the IDs of Lt-L BSs that contribute to dominant interference from the neighboring cluster when dominant interference level exceeds a predefined threshold.

Feedback Mode-2:

In this mode, to facilitate the wideband frequency domain CSI information to the cloud system, the UE reports CSI feedback for the antenna ports of the Lp best Pico BSs and the Lm best Macro BSs every "p" bands (predefined band).

In an embodiment, the predefined bands can be alternatively started with a band index and ending with another band index.

In an embodiment, the number predefined bands are decided by the UE.

In an embodiment, the number predefined bands are decided by the cloud.

In an embodiment, the UE reports the CSI feedback along with the respective BS IDs and ATP IDs to the cloud system.

In an embodiment, the CSI feedback may be quantized to reduce feedback overhead.

In an embodiment, the cloud system estimates the CSI feedback of the remaining bands using partial channel knowledge.

In an embodiment, the UE may feedback the IDs of Lt-L BSs that contribute to dominant interference from the neighboring cluster if the dominant interference level exceeds a predefined threshold.

Feedback Mode-3:

This mode facilitates to report the wideband CSI feedback to the cloud system. In an embodiment, the UE reports the time domain CSI feedback of the antenna ports of the Lp best Pico BSs and the Lm best Macro.

In an embodiment, the time domain CSI feedback along with the respective BS IDs and ATP IDs can be communicated to the cloud.

In an embodiment, the time domain CSI information may be quantized to reduce feedback overhead.

In an embodiment, the UE may feedback the IDs of Lt-L BSs that contribute to dominant interference from the neighboring cluster when the dominant interference level exceeds the predefined threshold.

Feedback Mode-4:

In this mode, the UE associates with the Macro or Pico BS. In an embodiment, the UE determines the best M-bands based on the CSI feedback of the BS (serving BS) to which it is associated with.

In an embodiment, the UE reports the CSI feedback for the antenna ports of the Lp best Pico BSs and the Lm best Macro BSs for the M-best bands as well as the band indices In an embodiment, the CSI feedback along with the respective BS IDs and ATP IDs will be communicated to the cloud system.

In an embodiment, the CSI feedback may be quantized to reduce feedback overhead.

In an embodiment, the UE may feedback the IDs of Lt-L BSs that contribute to dominant interference from the neighboring cluster when the dominant interference level exceeds the predefined threshold.

Feedback Mode-5:

In this mode, the UE associates with the Macro or Pico BS. In an embodiment, the UE determines the best M-bands based on the residual interference level measurements. The UE measures the total residual interference or total noise plus residual interference power in each band where residual interference is defined as the total received signal power measured in the band (including that of all antenna ports) excluding the total measured power level associated with the antenna ports of Macro or Pico BS for which CSI feedback is sent to the cloud. The UE further choose the best M bands which are defined as the M ordered bands with least residual noise plus interference power level or residual interference power level (The residual noise plus interference power levels of bands are ranked and select M bands with lease residual noise plus interference).

In an embodiment, the UE reports the CSI feedback for the antenna ports of the Lp best Pico BSs and the Lm best Macro BSs for the M-best bands as well as the band indices.

In an embodiment, the CSI feedback along with the respective BS IDs and ATP IDs will be communicated to the cloud system.

In an embodiment, the CSI feedback may be quantized to reduce feedback overhead.

In an embodiment, the UE may feedback the IDs of Lt-L BSs that contribute to dominant interference from the neighboring cluster when the dominant interference level exceeds the predefined threshold.

The various actions, acts, blocks, steps, and the like in the method 700 may be performed in the order presented, in a different order or simultaneously. Further, in some embodiment, some actions, acts, blocks, steps, and the like may be omitted, added, modified, skipped, and the like without departing from the scope of the embodiment.

The embodiment disclosed herein can be implemented through at least one software program running on at least one hardware device and performing network management functions to control the elements. The elements shown in FIGS. 3 and 4 include blocks which can be at least one of a hardware device, or a combination of hardware device and software module.

The foregoing description of the specific embodiment will so fully reveal the general nature of the embodiment herein that others can, by applying current knowledge, readily modify and/or adapt for various applications such specific embodiment without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation. Therefore, while the embodiment herein have been described in terms of preferred embodiment, those skilled in the art will recognize that the embodiment herein can be practiced with modification within the spirit and scope of the embodiment as described herein.

We claim:

1. A method of reporting channel state information (CSI) feedback by a UE in a clustered communication network, the method comprising:
   measuring signal strength of a plurality of base stations (BSs):
   selecting a set of BSs in said plurality of BSs based on highest signal strength; and
   reporting CSI feedback of said set of BSs and antenna ports associated with said plurality of BSs to a cloud system, wherein said plurality of BSs are present in one of a cluster associated with said UE, and a neighboring cluster, wherein said UE reports said CSI feedback of said set of BSs present in said neighboring cluster along with identifiers (IDs) of said plurality of BSs present in said neighboring cluster in response to determining interference level of said plurality of BSs in said neighboring cluster exceeds a predetermined threshold.

2. The method of claim 1, wherein selecting said set of BSs in said plurality of BSs based on said highest signal strength comprises:
   determining whether a serving BS of said UE is present in said set of BSs, wherein said serving BS is one of: a macro BS, and a pico BS; and
   including an identifier (ID) of said serving BS to said set of BSs in response to determining that said serving BS is absent in said set of BSs.

3. The method of claim 1, wherein said set of BSs comprises at least one of: a set of macro BSs, and a set of pico BSs.

4. The method of claim 1, wherein said CSI feedback is reported for one of: available band, and a set of bands.

5. The method of claim 4, wherein said set of bands spans over an entire available bandwidth.

6. The method of claim 1, wherein said CSI feedback is reported for a predefined band, wherein said predefined band is decided by one of: said UE, and said cloud system.

7. The method of claim 1, wherein said UE reports a time domain of said CSI feedback of said set of BSs to said cloud system.

8. The method of claim 1, wherein reporting said CSI feedback of said set of BSs to said cloud system comprises:
   determining a plurality of bands based on a CSI of a serving BS, wherein said serving BS is one of: a macro BS, and a pico BS; and
   reporting said CSI feedback of said set of BSs to said cloud system for said plurality of bands.

9. The method of claim 1, wherein said method further comprises:
   measuring a residual noise plus interference power level for a set of bands, wherein said residual noise plus interference power level is measured based on a total received signal power excluding a measured power level of said set of BSs and said antenna ports associated with said set of BSs.

10. The method of claim 9, wherein said method further comprises: selecting best bands in said set of bands with least value of said residual noise plus interference power level.

11. A cloud system comprising a plurality of clusters, wherein each said cluster comprises a plurality of base stations (BSs), and a user equipment (UE), wherein said UE is configured to:
    measure signal strength of said plurality of BSs;
    select a set of BSs in said plurality of BSs based on signal strength; and
    report CSI feedback of said set of BSs and antenna ports associated with said plurality of BSs to said cloud system, wherein said plurality of BSs are present in one of a cluster associated with said UE, and a neighboring cluster, wherein said UE reports said CSI feedback of said set of BSs present in said neighboring cluster along with identifiers (IDs) of said plurality of BSs present in said neighboring cluster in response to determining interference level of said plurality of BSs in said neighboring cluster exceeds a predetermined threshold.

12. The cloud system of claim 11, wherein said cloud system communicates the IDs of said plurality of BSs present in said neighboring cluster of said UE using a control channel.

13. A user equipment (UE) for reporting channel state information (CSI) feedback in a clustered communication network, the UE is configured to:
    measure signal strength of a plurality of base stations (BSs);
    select a set of BSs in said plurality of BSs based on highest signal strength; and
    report CSI feedback of said set of BSs and antenna ports associated with said plurality of BSs to a cloud system, wherein said plurality of BSs are present in one of a cluster associated with said UE, and a neighboring cluster, wherein said UE reports said CSI feedback of said set of BSs present in said neighboring cluster along with identifiers (IDs) of said plurality of BSs present in said neighboring cluster in response to determining interference level of said plurality of BSs in said neighboring cluster exceeds a predetermined threshold.

14. The UE of claim 13, wherein said UE is configured to select said set of BSs in said plurality of BSs based on highest signal strength comprises:
    determining whether a serving BS of said UE is present in said set of BSs, wherein said serving BS is one of: a macro BS, and a pico BS; and
    including an identifier (ID) of said serving BS to said set of BSs in response to determining that said serving BS is absent in said set of BSs.

15. The UE of claim 13, wherein said set of BSs comprises at least one of: a set of macro BSs, and a set of pico BSs.

16. The UE of claim 13, wherein said CSI feedback is reported for one of: available band, and a set of bands.

17. The UE of claim 16, wherein said set of bands spans over an entire available bandwidth.

18. The UE of claim 13, wherein said CSI feedback is reported for a predefined band, wherein said predefined band is decided by one of: said UE, and said cloud system.

19. The UE of claim 13, wherein said UE is configured to report a time domain of said CSI feedback of said set of BSs to said cloud system.

20. The UE of claim 13, wherein said UE is configured to report said CSI feedback of said set of BSs to said cloud system comprises:
    determining a plurality of bands based on a CSI of a serving BS, wherein said serving BS is one of: a macro BS, and a pico BS; and reporting said CSI feedback of said set of BSs to said cloud system for said plurality of bands.

21. The UE of claim 13, wherein said UE is further configured to:
measure a residual noise plus interference power level for a set of bands, wherein said residual noise plus interference power level is measured based on a total received signal power excluding a measured power level of said set of BSs and said antenna ports associated with said set of BSs.

22. The UE of claim 21, wherein said UE is further configured to: select best bands in said set of bands with a least value of said residual noise plus interference power level.

* * * * *